United States Patent [19]

Kohl

[11] Patent Number: 5,129,614
[45] Date of Patent: Jul. 14, 1992

[54] COMBINATION LEASH AND CARD HOLDER

[76] Inventor: Sam Kohl, 41 Sullivan Dr., Jericho, N.Y. 11753

[21] Appl. No.: 680,436

[22] Filed: Apr. 4, 1991

[51] Int. Cl.⁵ .............................................. A47F 5/00
[52] U.S. Cl. ............................ 248/309.2; 40/649
[58] Field of Search ............... 248/309.1, 309.2, 205.1; 211/89, 87, 59.1, 32; 40/649, 308, 663, 666, 669

[56] References Cited

U.S. PATENT DOCUMENTS

| | | | |
|---|---|---|---|
| 1,690,965 | 11/1928 | Brown | 40/649 |
| 2,626,713 | 1/1953 | Peacock | 211/89 |
| 3,029,537 | 4/1962 | Hopp et al. | 40/308 X |
| 4,027,799 | 6/1977 | Stucker | 211/59.1 X |
| 4,674,721 | 6/1987 | Thalenfeld | 211/59.1 X |
| 4,869,376 | 9/1989 | Valiulis | 211/59.1 |
| 5,020,759 | 6/1991 | Weber | 248/309.2 |

*Primary Examiner*—J. Franklin Foss
*Attorney, Agent, or Firm*—Michael I. Kroll

[57] ABSTRACT

A combination leash and card holder is provided and consists of a rectangular plate with structures thereon for mounting the plate to a cage bar or a wall. The plate also has structures thereon for holding a pet identification card and a pet leash thereto.

5 Claims, 1 Drawing Sheet

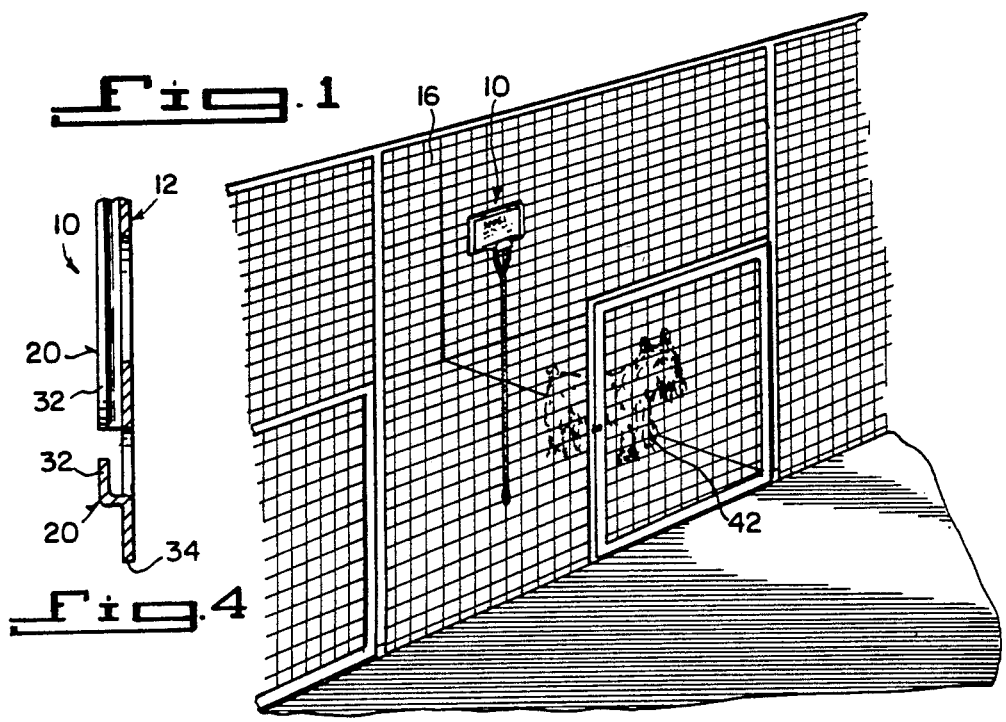
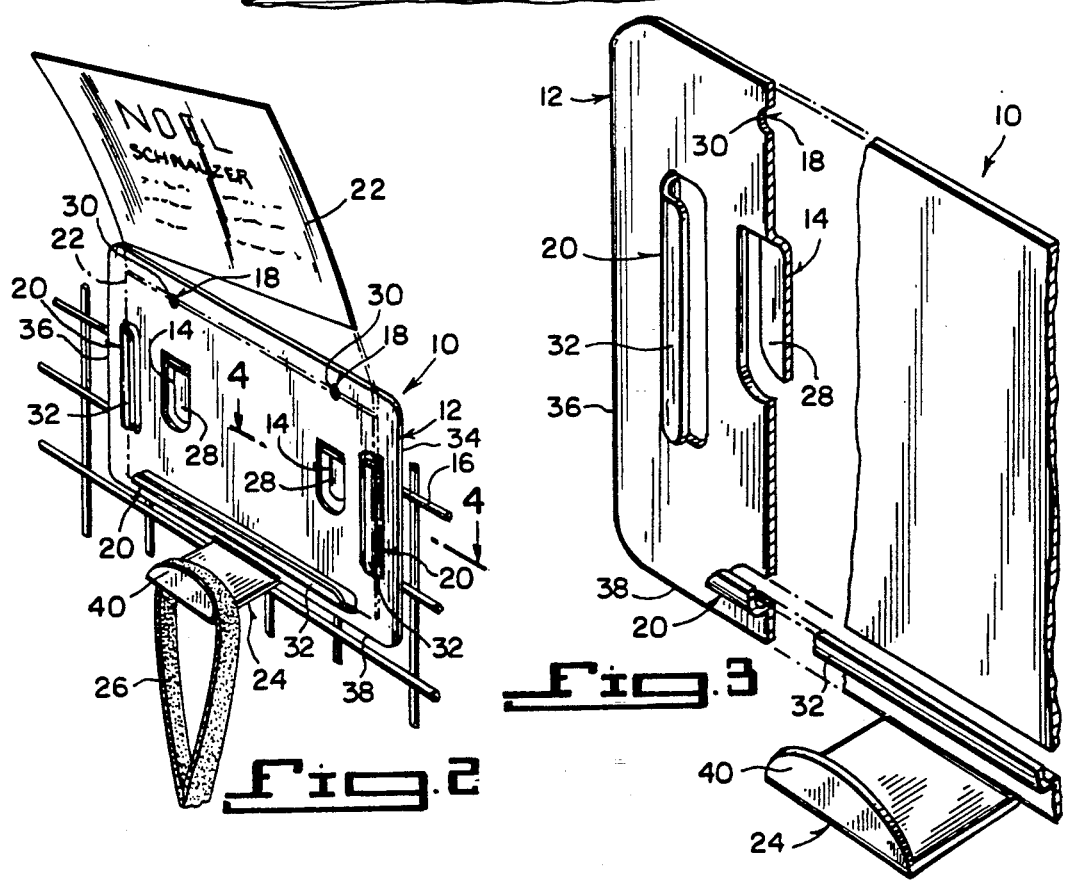

COMBINATION LEASH AND CARD HOLDER

BACKGROUND OF THE INVENTION

1. Field of the Invention

The instant invention relates generally to support devices and more specifically it relates to a combination leash and card holder.

2. Description of the Prior Art

Numerous support devices have been provided in prior art that are adapted to keep various items from falling or slipping to the floor. While these units may be suitable for the particular purpose to which they address, they would not be as suitable for the purposes of the present invention as heretofore described.

SUMMARY OF THE INVENTION

A primary object of the present invention is to provide a combination leash and card holder that will overcome the shortcomings of the prior art devices.

Another object is to provide a combination leash and card holder that can be mounted to a wall or a cage so as to removably hold both a identification card and a leash for a pet thereto in a kennels, grooming or bathing area.

An additional object is to provide a combination leash and card holder that will keep an expensive pet leash with the pet and can also indicate on the card for a verterinarian to see the proper medication for the pet to take for treatment.

A further object is to provide a combination leash and card holder that is simple and easy to use.

A still further object is to provide a combination leash and card holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention mounted on a cage in a kennels.

FIG. 2 is an enlarged perspective view of the invention mounted on the cage showing how the card is placed thereon.

FIG. 3 is a perspective view of the invention with parts broken away and in section.

FIG. 4 is a cross sectional view taken along line 4—4 in FIG. 2.

DETAILED DESCRIPTION OF THE PREFERRED EMBODIMENTS

Turning now descriptively to the drawings, in which similar reference characters denote similar elements throughout the several views, FIGS. 1 through 4 illustrates a combination leash and card holder 10 consisting of a rectangular plate 12, a first structure 14 for mounting the plate 12 to a cage bar 16, a second structure 18 for mounting the plate 12 to a wall (not shown), a third structure 20 for holding a pet identification card 22 to the plate 12 and a fourth structure 24 for holding a pet leash 26 on the plate 12.

The first structure 14 includes a pair of spaced apart bent tabs 28 integrally formed to extend rearwardly from out of the plate 12, which will securely attach the plate 12 to the cage bar 16, preventing the plate 12 from rattling.

The second structure 18 includes the plate 12 having a pair of spaced apart holes 30 so that a fastener (not shown), such as a nail or screw, can extend through each of the holes 30 in the plate 12 and go into the wall.

The third structure 20 includes a track 32 integrally formed to extend forwardly from out of the plate 12 near the right side 34, the left side 36 and the bottom 38 of the plate 12, so that the track 32 can hold the pet identification card 22 in place against the plate 12.

The fourth structure 24 includes a hook member 40 on the bottom 38 of the plate 12 which extends forwardly so that the hook member 40 can hold the pet leash 26 thereto.

The plate 12, the bent tabs 28, the track 32 and the hook member 40 are fabricated out of a thin durable metal material, as shown in the drawings or they can be fabricated out of a thin durable plastic material.

To use the combination leash and card holder 10, a person can simply mount the bent tabs 28 onto the cage bar 16. The pet identification card 22 is slipped into the track 32 and the pet leash 26 placed onto the hook member 40. The pet identification card 22 can indicate to a veterinarian or attendant the proper medication for the pet to take for treatment. While the hook member 40 will keep an expensive pet leash 26 with the pet 42 so that the pet leash 26 will not get lost.

LIST OF REFERENCE NUMBERS 10 combination leash and card holder
12 rectangular plate
14 first structure
16 cage bar
18 second structure
20 third structure
22 pet identification card
24 fourth structure
26 pet leash
28 bent tab in 12
30 hole in 12
32 track in 12
34 right side of 12
36 left side of 12
38 bottom of 12
40 hook member
42 pet It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A combination leash and card holder comprising:
   a) a rectangular plate;
   b) means for mounting said plate to a cage bar said means includes a pair of spaced apart bent tabs integrally formed to extend rearwardly from out of said plate, which will securely attach said plate to the cage bar, preventing said plate from rattling;
   c) means for mounting said plate to a wall;
   d) means for holding a pet identification card to said plate said means includes a track integrally formed to extend forwardly out of said plate near the right side, the left side and the bottom of said plate, so that said track can hold the pet identification card in place against said plate;
   e) means for holding a pet leash on said plate.

2. A combination leash and card holder as recited in claim 1, wherein said wall mounting means includes said plate having a pair of spaced apart holes so that a fastener can extend through each of said holes in said plate and go into the wall.

3. A combination leash and card holder as recited in claim 1, wherein said pet leash holding means includes a hook member on the bottom of said plate which extends forwardly so that said hook member can hold the pet leash thereto.

4. A combination leash and card holder as recited in claim 3, wherein said plate, said bent tabs, said track and said hook member are fabricated out of a thin durable metal material.

5. A combination leash and card holder as recited in claim 3, wherein said plate, said bent tabs, and said track and said hook member are fabricated out of a thin durable plastic material.

* * * * *